April 23, 1957 M. L. SMALLEGAN 2,789,407
DEVICE FOR SHRINKING FILMS
Filed June 11, 1953 2 Sheets-Sheet 1
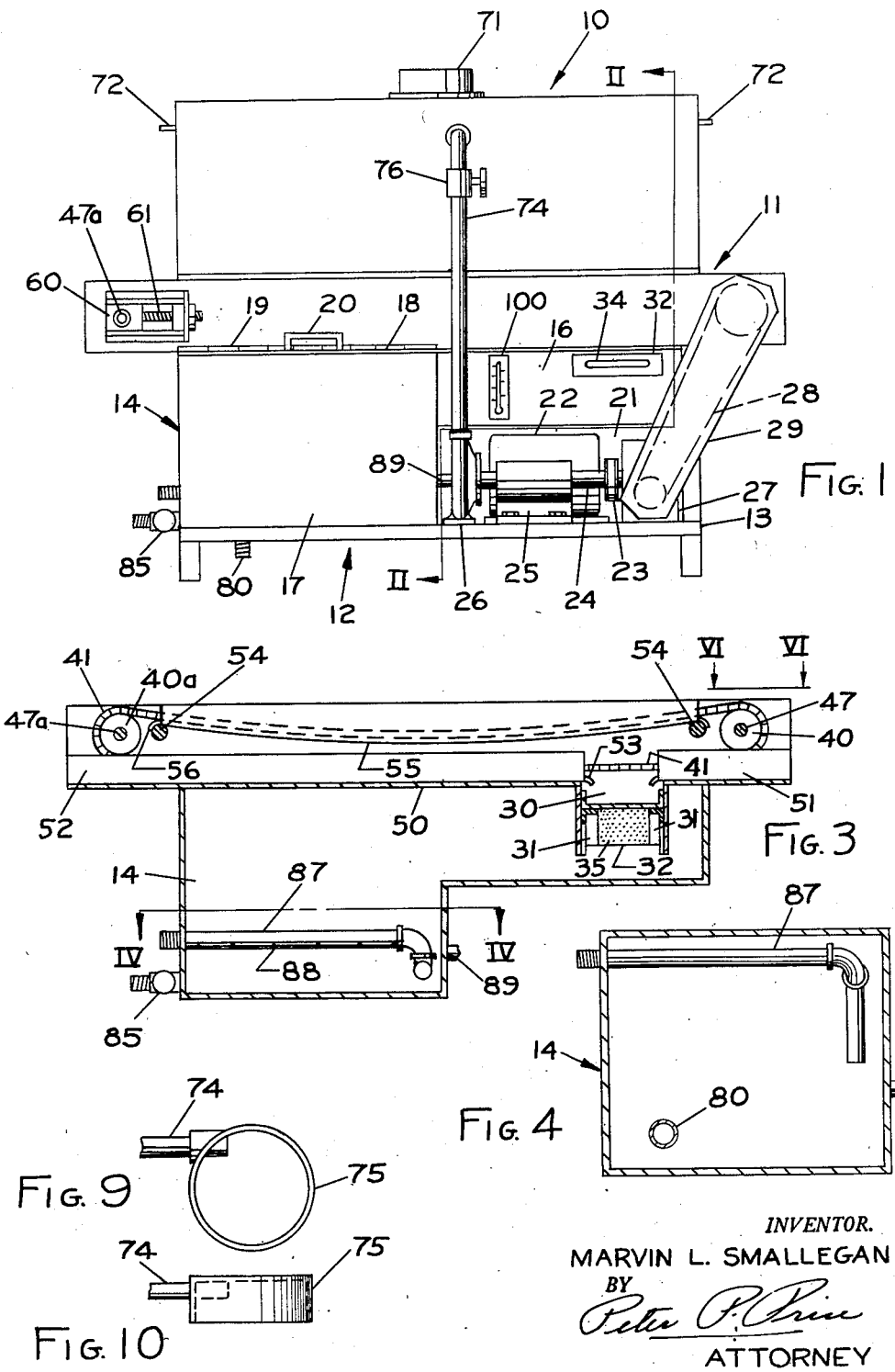
INVENTOR.
MARVIN L. SMALLEGAN
BY
ATTORNEY

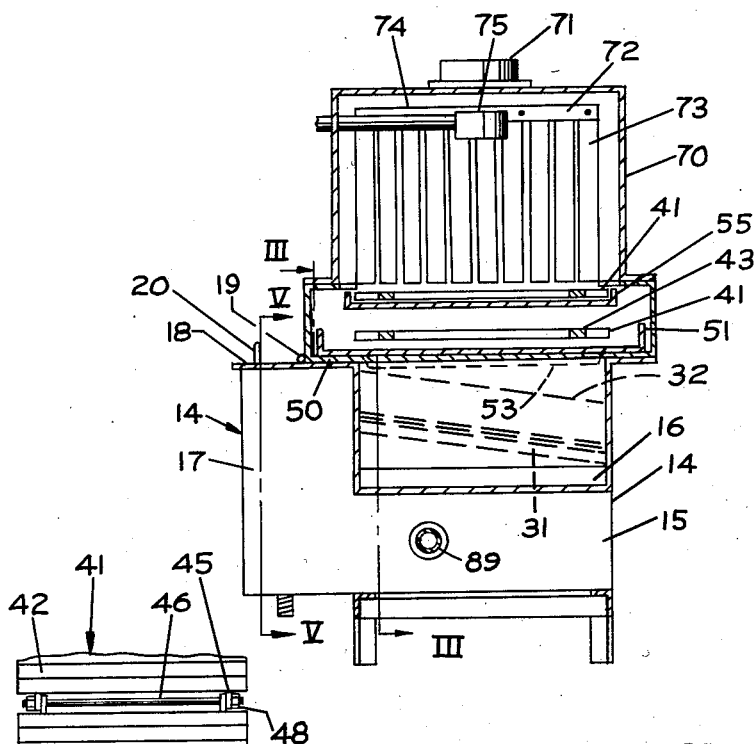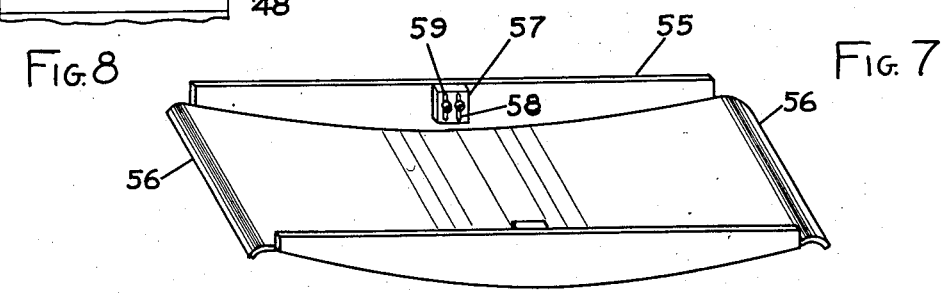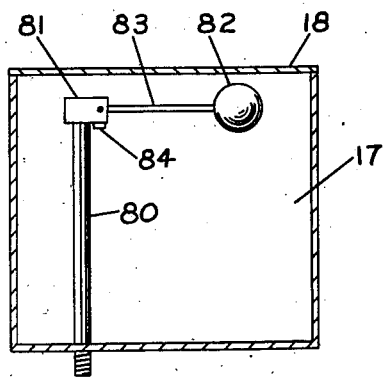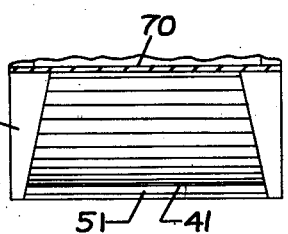

United States Patent Office

2,789,407
Patented Apr. 23, 1957

2,789,407
DEVICE FOR SHRINKING FILMS

Marvin L. Smallegan, Zeeland, Mich., assignor to Automatic Poultry Feeder Company, Zeeland, Mich., a corporation of Michigan Application June 11, 1953, Serial No. 361,038
2 Claims. (Cl. 53—184)

This invention relates to machines for shrinking plastic films and more particularly for the purpose of shrinking a heat sensitive film over a poultry carcass and other meat products for the purpose of enclosing the carcass in a smooth, airtight casing.

For some time now, it has been conventional practice to enclose meat products in a transparent, plastic, film casing. After the casing has been closed, it is evacuated. This causes the film to form deep wrinkles and folds. These are removed by heating the film to shrink it. This is possible because the films used are dimensionally unstable when exposed to heat. An example of such a film is "Seran," made by Dow Chemical Company, Midland, Michigan and merchandised by the Dewey-Almy Chemical Co., Cambridge, Mass., under the trademark "Cry-O-Vac." Films of this type having been sealed, evacuated and treated under heat, shrink to form a substantially transparent, smooth, airtight casing, sealing the interior from bacteria and mold. This casing increases merchantability by protecting the carcass from damage or contamination due to handling.

Machines for effecting the shrinkage of these films exist but by reason of their design and construction are cumbersome, unsanitary and inefficient. They are large and expensive machines so designed that it is substantially impossible to clean them and present many exposed, moving parts. This results both in danger to the employees and unsanitary handling of the carcasses.

It is the object of my invention to provide a compact, light weight machine constructed of easy to clean materials. It is a further object of my invention to so design the machine that is operating components are readily accessible for quick, complete and easy cleaning. It is a further object of my invention to enclose the exterior moving parts of the machine to prevent the accumulation of dirt and guard the operators. It is a further object of my invention to reduce the number of components to only those essential to satisfactorily carry out the objects for which the machine is designed. By means of this design, I have provided a machine of simple and rugged design, compact enough to meet the needs of the smallest plants and capable of fabrication at a cost substantially below that of existing equipment.

These and other objects and purposes of my invention will be immediately seen by those acquainted with the design and construction of poultry processing equipment upon reading the following specification and the accompanying drawings.

In the drawings:

Fig. 1 is a side elevation view of my invention.

Fig. 2 is a sectional elevation view of my invention taken along the plane II—II of Fig. 1.

Fig. 3 is a sectional elevation view of my invention taken along the plane III—III of Fig. 2, omitting the supporting frame and the exterior, operating mechanism for the machine.

Fig. 4 is a plan sectional view taken along the plane IV—IV of Fig. 3.

Fig. 5 is a sectional elevation view taken along the plane V—V of Fig. 2 showing the water inlet only.

Fig. 6 is a fragmentary plan view taken along the plane VI—VI of Fig. 3.

Fig. 7 is an oblique view of the dipping tray of my invention.

Fig. 8 is a fragmentary view of the detachable joint in the conveyor for my invention.

Fig. 9 is a bottom view of the spray head used in my invention.

Fig. 10 is a side elevation view of the spray head appearing in Fig. 9.

In executing the objects and purposes of my invention, I have provided a machine consisting of an upper chamber within which hot water is sprayed upon film covered carcasses being transported through the bottom of the chamber by means of a conveyor mounted in the central section of my machine. The conveyor dips the carcasses in a shallow tray to heat the bottom of the film. This produces equal shrinkage since that portion of the film not subjected to heating by the spray is heated by the dip. Removable tray means are provided to catch the water that has passed over the processed articles. This water is returned through a screen to the bulk water supply tank located in the lower section of the machine.

Steam heating means are provided in the bulk tank to reheat the water and supply a pump with properly heated water to be discharged by the spray nozzle. The single motor provided in the machine operates both the pump and the conveyor. The machine is designed for rapid disassembly and cleaning.

In the following descriptions, the terms "forward" and "rearward" are used and are to be taken to mean "forward" toward the left hand end of the machine as it appears in Fig. 1, this being the article receiving end of the conveyor, and "rearward" away therefrom.

Referring to the drawings in detail, my machine is basically composed of three primary sections, the upper section 10, the central section 11 and the bottom section 12. The machine is supported by a pedestal 13 upon which rests the tank 14 forming part of the bottom section 12. The tank 14 consists of a main portion 15, a rearward portion 16 and a side portion 17. The side portion 17 of the tank extends laterally beyond the side of the machine (Fig. 2) and is closed at its upper end by a cover 18 hinged at 19 and equipped with a handle 20. The bottom of the rearward portion 16 of the tank is spaced substantially from the pedestal 13 to provide a compartment 21 (Fig. 1) for the operating machinery. Mounted to the pedestal within this compartment is a prime mover 22 which, by means of a belt 23, drives a shaft 24. The forward end of the shaft 24 extends through a main bearing 25 to a centrifugal pump 26. The rearward end of the shaft 24 is connected to a speed reducer 27 which, in turn, operates the hereinafter described conveyor through the chain and sprocket combination 28 enclosed by the removable cover 29.

Extending down into the rearward portion 16 of the tank is a compartment 30 (Fig. 2). The compartment 30 is open to the tank at its lower end. Internally it has a pair of side rails 31 on which is seated a tray 32 (Figs. 2 and 3). The upper end of the tray projects through the wall of the tank and is provided with a handle 34 (Fig. 1) so that it may be readily withdrawn from the compartment 30. The rails 31 are inclined downwardly away from the exteriorly projecting end of the tray. The bottom of the tray is perforated with holes 35 permitting the escape of water into the tank but small enough to retain any solid particles entrained in the water. The tray 32 extends the full width of the tank.

The central section 11 projects beyond the general outline of the machine both at each end and along each side and has the general contour of a thin rectangle. Mounted within the central section 11, adjacent each end, is a roller 40 (Fig. 3) for operating the slat conveyor 41. The conveyor 41 may be of any suitable construction so long as it will support the carcasses and permit water to flow through it. The one shown is of the slat type consisting of a plurality of wooden slats 42 flexibly joined by means of links 43 extending through the slats. The particular mechanism by which the slats are joined is immaterial to this invention and many types and designs of such mechanisms are currently commercially available.

The rollers 40 and 40a are mounted on shafts 47 and 47a respectively. The shaft 47a is an idler and is mounted at each end in guided sliding blocks 60 made adjustable longitudinally of the central section 11 by means of the threaded member 61. Adjustment of the sliding blocks 60 provides the conveyor 41 with the correct tension for proper operation. The shaft 47 is driven by means of the chain and sprocket combination 28.

The conveyor 41 is provided with at least one separable joint 44 (Fig. 8). In the construction shown, the ears 45 on the slats are pivotally secured by the removable rod 46. The rod 46 is threaded on each end to receive the self-locking nuts 48.

The side walls of the central section are joined by a web forming a bottom 50 for the central section. This bottom is apertured directly above the compartment 30. Seated on the bottom 50 are a pair of trays 51 and 52. Both trays are open at their inward ends and are equipped with a downwardly turned lip 53 and over this lip discharge into the compartment 30. The outer ends of both trays extend to the end of the central section 11. The trays extend substantially forwardly of the central section and beyond the lateral edges of the conveyor 41. The trays are equipped with sides so they will discharge into the compartment 30 only. Since the outward ends of the trays extend to the end of the central section 11 they may be readily removed simply by withdrawing the trays from the end of the central section. The small tray 52 is identical to the large tray 51 except for size.

The return run of the conveyor 41 is within the trays.

Spaced substantially above the trays 51 and 52 and adjacent each of the rollers 40 and 40a is a rod 54 extending laterally of the central section 11 (Figs. 2, 3 and 7). The rods are permanently secured to the side walls of the central section. A shallow, concavely shaped tray 55 rests upon the rods 54. The tray 55 is open at each end. At the open ends it has a downwardly curved flange 56 seating over and engaging the rods 54. The tray 55 is provided with upwardly flanged walls extending substantially to the top of the central section 11.

At the center of the tray 55 and on each side thereof, a vertically adjustable shoe 57 is mounted for the purpose of regulating the concavity of the upper run of the conveyor 41 within the tray. Each of the shoes has a pair of parallel slots 58 through which pass threaded fasteners 59. The lower ends of the shoes 57 are slightly arcuate and press against the top surface of the conveyor 41. The vertical position of the shoes determines the depth at which the conveyor will travel in the tray.

Seated upon the central section 11 is the top section 10 consisting of a generally rectangular shaped housing 70 open at its lower face and at both ends. A vent 71 is provided through the top of the housing 70. At each of the open ends of the housing 70 there is detachably mounted an angle 72 from which are suspended flexible strips 73 of fabric or plastic. The flexible strips 73 form a curtain against the passage of water or steam while permitting the articles placed on the conveyor to pass through the opening without interference.

A pipe 74 extends from the pump 26 and adjacent the top of the housing 70 passes through the side of the housing. The pipe 74 terminates in a spray head 75 located substantially at the center of the housing. The spray head 75 has the shape of a shallow, inverted cup (Figs. 9 and 10) into which the pipe 74 discharges the water tangential so that a whirling, cone-shaped, curtain of water is created. The pipe 74, adjacent its upper end and externally of the housing 70, is provided with a manual shut-off valve 76.

Water is admitted to the tank 14 in the side portion 17 of the tank through the pipe 80 (Fig. 5). The pipe 80 is threaded externally of the tank to provide a connection to a convenient water source. A valve 81 is located at the top of the pipe 80. The valve is regulated by the float 82 mounted on the arm 83 and discharges through the port 84.

Water is drained from the tank 14 through the valve 85. The valve 85 may be connected to any suitable drainage facility.

The water in the tank 14 is heated by steam admitted through the coil 87 (Figs. 3 and 4). The steam is discharged through small orifices 88 in coil 87. These orifices are approximately 3/16 of an inch in diameter and spaced about 2 inches apart. The coil 87 extends first along the back of the main portion of the tank and then along the inside wall of the tank to a point adjacent the pump intake 89. The orifices 88 in the portion along the back discharge at a downward angle while those in the portion adjacent the pump intake 89 discharge straight down. The external end of the coil 87 is threaded for connection to a suitable source of steam.

The various components of the tank, housing and trays are preferably fabricated from stainless steel sheet because of its corrosion resistance and the ease with which it may be cleaned after use. The other components of the machine are fabricated from any suitable material.

*Operation*

Before my machine is operated it is connected to a suitable source of steam and to a suitable source of water. The tank is then filled. The water supply will be turned off automatically by the valve 81 when the water has reached the correct level. Steam is then admitted to the coil 87 and discharges through the orifices 88. The downward direction of discharge of the steam assures a through mixing of the steam and water and consequently rapid, thermal transfer. As soon as the water is heated to around 200°, as indicated by the thermometer 100, the machine may be operated.

The valve 76 is opened and the motor 22 started. This immediately starts operation of the pump 26 and of the conveyor 41. The machine is now ready to receive the packaged carcasses. Since considerable steam is generated in the upper chamber due to the discharge of hot water, the vent 71 should be connected to a suitable exhaust system to lead the steam out of the operating room. The product, which could be meat, cheese, or others, already wrapped and sealed in an evacuated plastic casing, is placed on the left hand end of the conveyor. At both the front and rear of the machine the conveyor 41 projects substantially beyond the housing 70 (Fig. 6) to provide steam free, loading and unloading facilities.

The conveyor automatically moves the product under the spray head 75 where the discharge of hot water causes the film to shrink. Since the lower portion of the film is not exposed to the water being discharged from the head 75, the tray 55 is provided as a dip to assure heating of this area of the plastic container to cause even shrinkage all around the product. This is accomplished by causing the top run of the conveyor 41 to travel a concave path, thus carrying the product down into the shallow pool of water in the tray 55.

The speed of the conveyor is established at that which will move the product through with only sufficient time to assure a complete shrinkage of the film. The conveyor automatically moves the product to the right hand end of the machine where it may be either manually removed or discharged onto another conveyor to be transported for further processing. It will be recognized that my machine may be incorporated in a conveyor line with the product being automatically supplied to the machine by a conveyor and automatically removed from the machine by another conveyor.

Products of various sizes require different dipping depths. Thus, a smaller product needs a shallow dip by comparison to a large product. It is for this purpose that the shoes 57 are provided. The shoes press the conveyor 41 down into the tray 55. If a shallow dip is desired the shoes 57 are adjusted upwardly, permitting the conveyor 41 to travel somewhat higher above the bottom of the tray 55. When this is done, conveyor 41 is tightened by rotation of the screws 61 moving the slide blocks 60 outwardly.

The water in the tray 55 is always hot and effective because it receives the full discharge of the spray head 75. The volume of water is so great that this water is rapidly changed in the tray with the excess water discharging over the ends of the tray into the lower trays 51 and 52. This also keeps the water in the tray 55 clean so that no particles will be left on the finished package.

The head 75 is so designed that it does not divide the water into fine particles. It discharges the water in a conical curtain of sufficient diameter to extend across the conveyor and thus assures adequate treatment of all portions of any article passing through the machine, irrespective of its size. If the head discharges the water as a fine spray, considerable steam is generated. This steam formation results in an appreciable thermal loss, greatly reducing the effectiveness of the machine. Further, the generation of excessive quantities of steam makes the machine difficult to operate because there will be a tendency for some of the steam to escape through the flexible curtains at each end, making it not only difficult for the operators to see what they are doing but creating unpleasant and dangerous working conditions. The cone-shaped, curtain type of discharge assures a thorough heating of the film and allows no cooling of the film to occur during the actual shrinking process.

The water flowing over the edge of the removable tray 55 and discharged into the trays 51 and 52 flows toward the compartment 30 and is discharged into it. There the water, before it can return to the tank, must pass through the apertured bottom of the screen 32 completely removing all foreign particles from the water. This not only keeps the water clean and permits its reuse over and over again but prevents bits and other foreign matter from getting into the pump 26 or spray head 75 to cause defective operation. The screen 30 may be quickly cleansed by simply withdrawing it by means of the handle 34 and washing it and returning it to its original position. Because of its inclination it has no tendency to come out unless forcibly removed.

The shape of the tank assures enough water being kept in the tank to keep the pump 26 flooded. Thus, a light duty, relatively inexpensive pump may be used since the pump does not have to raise the water but merely has to put it under sufficient pressure to operate the head 75. This greatly reduces the cost of the equipment by permitting the use of a pump of economical design.

The use of steam to heat the water is preferable because it is economical, particularly in poultry processing plants where steam is normally available as a requirement of other processes. At the same time, it permits economical construction of the machine itself. This type of heating produces a substantially trouble free structure since there are no moving parts or fine adjustments necessary to keep the mechanism operating effectively.

When it is necessary to clean the machine, the trays 51 and 52 are simply removed by withdrawing them from the ends of the central section 11. Once removed from the machine, they are readily accessible for thorough cleansing. The conveyor 41 is removed simply by disassembling the special separable joint and withdrawing the conveyor from the machine. With the conveyor removed, the tray 55 may be simply lifted out. The inside of the housing 70 is readily accessible from each end of the machine. Because the returned water is screened, very little dirt accumulates in the tank but that which does accumulate may be simply removed by draining the water through the valve 85 and flushing the tank out with a hose inserted by means of the hinged cover 18. This construction permits the whole machine to be quickly and thoroughly cleaned in a matter of minutes. This represents a substantial operating economy.

It will be recognized that various modifications of my machine may be made such as substituting a gas or electric heater for the steam heating or changing the particular construction of the conveyor itself. These changes do not affect the principle of my invention and each of them and others of a similar nature are to be considered as included in the hereinafter appended claims unless these claims by their language expressly state otherwise.

I claim:

1. In means for shrinking heat sensitive organic plastic casings about articles enclosed therein, the combination comprising: a pedestal; a tank mounted on said pedestal; means for supplying water to said tank; means for heating the water in said tank; a central housing mounted on said tank; an endless conveyor having an upper run and a lower run, said conveyor mounted in said central housing and overlying said tank; a pair of rods mounted on said central housing and extending through said conveyor between the upper and lower runs thereof; one of said rods being adjacent each end of said conveyor; a concave tray suspended on and between said rods; vertically adjustable shoes at the center of said tray; said upper run of said conveyor passing below said shoes whereby said shoes may cause said upper run to follow the concave contour of said tray; the top surface of said conveyor being below the top of said tray and immersed in the contents of said tray; a top housing having openings at each end and mounted over said conveyor; said openings being aligned with said conveyor; a spray head in said top housing above said conveyor; a pump; means connecting the intake end of said pump to said tank; means connecting the discharge end of pump to said spray head.

2. In means for shrinking heat sensitive organic plastic casings about articles enclosed therein, the combination comprising: a pedestal; a tank mounted on said pedestal; means for supplying water to said tank; means for heating the water in said tank; a central housing mounted on said tank; an endless conveyor having an upper run and a lower run, said conveyor mounted in said central housing and overlaying said tank; a pair of rods mounted on said central housing and extending through said conveyor between the upper and lower runs thereof; one of said rods being adjacent each end of said conveyor; a concave tray suspended on and between said rods; vertically adjustable shoes at the center of said tray; said upper run of said conveyor passing below said shoes whereby said shoes may cause said upper run to follow the concave contour of said tray; the top surface of said conveyor being below the top of said tray and immersed in the contents of said tray; a pair of removable lower trays seated in said central housing beneath said conveyor; each of said lower trays being slidable through an end of said central housing; each of said lower trays being open on its inward end; a removable screen beneath the open ends of said lower trays and above said tank whereby water discharged from said lowered trays passes through said screen to reach said tank; a track slidably supporting said screen, said track extending laterally of said conveyor; a top housing having openings at each end mounted over said conveyor; said opening being aligned with said conveyor; a spray head in said top housing above said conveyor; a pump; means connecting the intake end of said pump to said tank; means connecting the discharge end of pump to said spray head.

References Cited in the file of this patent

UNITED STATES PATENTS

| | | |
|---|---|---|
| 2,114,758 | Young | Apr. 19, 1938 |
| 2,670,573 | Sullivan | Mar. 2, 1954 |

OTHER REFERENCES

"New Cryovac," Modern Packaging, vol. 21, No. 7, March 1948, pages 115–119 and 193.